United States Patent
Van Broekhoven

[19]

[11] Patent Number: 5,905,138

[45] Date of Patent: May 18, 1999

[54] PROCESS FOR THE PREPARATION OF COPOLYMERS

[75] Inventor: Johannes Adrianus Maria Van Broekhoven, CM Amsterdam, Netherlands

[73] Assignee: Shell Oil Company, Houston, Tex.

[21] Appl. No.: 08/801,977

[22] Filed: Feb. 19, 1997

[30] Foreign Application Priority Data

Feb. 29, 1996 [EP] European Pat. Off. .............. 96200530

[51] Int. Cl.$^6$ .................................................... C08G 67/02
[52] U.S. Cl. .......................... 528/392; 528/483; 524/701; 524/706; 524/709; 524/711; 524/765; 524/767; 524/770; 524/773; 524/785; 522/3; 502/167
[58] Field of Search ..................................... 528/392, 483; 524/701, 706, 709, 711, 765, 767, 770, 773, 785; 522/3; 502/167

[56] References Cited

U.S. PATENT DOCUMENTS

| | | | |
|---|---|---|---|
| 5,658,982 | 8/1997 | Baardman et al. | 524/711 |
| 5,668,249 | 9/1997 | Baardman et al. | 528/392 |
| 5,670,611 | 9/1997 | Baardman et al. | 528/392 |

FOREIGN PATENT DOCUMENTS

| | | |
|---|---|---|
| 340844 | 11/1989 | European Pat. Off. . |
| 453011 A2 | 10/1991 | European Pat. Off. . |
| 614928 A2 | 9/1994 | European Pat. Off. . |
| 619334 A1 | 10/1994 | European Pat. Off. . |
| 733660 | 9/1996 | European Pat. Off. . |

OTHER PUBLICATIONS

Search Report dated Feb. 17, 1998.

*Primary Examiner*—Samuel A. Acquah
*Attorney, Agent, or Firm*—Todd F. Volyn

[57] ABSTRACT

A process for the preparation of a copolymer of carbon monoxide with an olefinically unsaturated compound in which a powder of a copolymer of carbon monoxide with an olefinically unsaturated compound is suspended in a liquid diluent. The suspension is contacted with a catalyst composition which is soluble in the diluent and which is based on a Group VIII metal and a bidentate ligand. The catalyst composition is used in such a quantity that in the polymerization mixture more than 0.1 mmoles of the Group VIII metal is present per liter of liquid phase.

11 Claims, No Drawings

PROCESS FOR THE PREPARATION OF COPOLYMERS

FIELD OF THE INVENTION

The invention relates to a process for the preparation of a copolymer of carbon monoxide with an olefinically unsaturated compound.

BACKGROUND OF THE INVENTION

It is well known in the art that processes for the preparation of a copolymer of carbon monoxide and an olefinic monomer can involve the copolymerization of the monomers in the presence of a catalyst composition containing a Group VIII metal and a bidentate ligand of the general formula $R^1R^2M^1$—R—$M^2R^3R^4$, wherein $M^1$ and $M^2$ independently represent a phosphorus, nitrogen, arsenic or antimony atom, $R^1$, $R^2$, $R^3$ and $R^4$ independently represent a nonsubstituted hydrocarbyl group and R represents a bivalent organic bridging group containing at least 1 carbon atom in the bridge, in a diluent in which the prepared copolymer forms a suspension. EP-A-213671 presents such a process. The copolymers prepared are aliphatic copolymers wherein the monomer units originating from carbon monoxide and the monomer units originating from the olefinically unsaturated compounds occur in alternating or substantially alternating order.

The economy of such processes can be improved by increasing the reactor productivity. The productivity of a polymerization reactor may be defined as the quantity of copolymer which can be prepared within a given period of time using a given reactor volume. The reactor volume is normally in a direct relation with the suspension volume or the volume of the liquid phase. In this document the liquid phase volume is meant to include the volumes of a liquid diluent and any monomer present in the liquid phase at the conditions of the copolymerization, but it excludes the volume of the copolymer suspended in the liquid phase.

The reactor productivity may be increased by raising the temperature or the pressure so that the specific polymerization rate, i.e. the quantity of copolymer produced per mole Group VIII metal per hour, is increased. However, by raising the temperature or the pressure structural features of the prepared copolymer such as the molecular weight may also change. This is not necessarily desired.

The quantity of the Group VIII metal present in the reaction mixture has typically been below 0.1 mmole per liter liquid phase, most frequently in the range of 0.01–0.05 mmole per liter liquid phase. EP-95200719.3 comprises an example of a copolymerization of carbon monoxide with olefinically unsaturated compounds in dichloromethane as a liquid diluent using a catalyst composition based on palladium as a Group VIII metal, 1,3-bis[bis(2-methoxyphenyl)phosphino]propane as a bidentate ligand of the general formula $R^5R^6M^1$—R—$M^2R^7R^8$ and, in addition, tris (perfuorophenyl)borane as an example of a hydrocarbyl boron compound. Prior to the copolymerization a copolymer was suspended in the diluent. The catalyst composition was used in a quantity which contains 0.025 mmoles Group VIII metal and a liquid phase volume was applied which is obtainable by combining in a 300 ml autoclave at 80° C. 110 ml dichloromethane, 25 g propene and such a quantity of a carbon monoxide/-ethene 1:1 molar mixture that a 5.0 MPa pressure is obtained.

In principle, an increase in the reactor productivity may be accomplished by raising the concentration of the catalyst present in the polymerization mixture so that more copolymer may be produced in the same volume and within the same time. However, Applicant has found that, when using as the bidentate ligand a compound of the general formula $R^1R^2M^1$—R—$M^2R^3R^4$, an increase of the catalyst concentration to a higher value, i.e. outside the range of 0.01–0.05 mmole Group VIII metal per liter liquid phase, leads to a decreased specific polymerization rate and to a decreased molecular weight of the copolymer. These results are not satisfactory.

It has now been found that an increase in the concentration of the catalyst in the polymerization mixture does not lead to a change in the specific polymerization rate if prior to the polymerization a previously prepared copolymer is suspended in the diluent and if as a catalyst component a bidentate ligand is used which comprises a polar substituted hydrocarbyl group at the dentate groups. In this case, the productivity increases in proportion with the catalyst concentration. It is also advantageous and surprising that under these circumstances there is no change in the molecular weight of the copolymer prepared.

SUMMARY OF THE INVENTION

This invention is directed to a process for the preparation of a copolymer of carbon monoxide with an olefinically unsaturated compound, which process comprises suspending a powder of a copolymer of carbon monoxide with an olefinically unsaturated compound in a liquid diluent in which the copolymer to be prepared forms a suspension and subsequently contacting the monomers in the suspension so obtained with a catalyst composition which is soluble in the diluent and which is based on a Group VIII metal and a bidentate ligand of the formula $R^5R^6M^1$—R—$M^2R^7R^8$, wherein $M^1$ and $M^2$ independently represent a phosphorus, nitrogen, arsenic or antimony atom, $R^5$, $R^6$, $R^7$ and $R^8$ independently represent an optionally polar substituted hydrocarbyl group, on the understanding that at least one of $R^5$, $R^6$, $R^7$ and $R^8$ represents a polar substituted hydrocarbyl group, and R represents a bivalent organic bridging group containing at least one carbon atom in the bridge, and which catalyst composition is used in such a quantity that in the polymerization mixture more than 0.1 mmoles of the Group VIII metal is present calculated per liter of liquid phase.

DETAILED DESCRIPTION OF THE INVENTION

Olefinically unsaturated compounds which can be used as monomers in the copolymerization process of the invention include compounds consisting exclusively of carbon and hydrogen and compounds which in addition comprise hetero atoms, such as unsaturated esters, ethers and amides. Unsaturated hydrocarbons are preferred. Examples of suitable olefinic monomers are lower olefins, such as ethene, propene and butene-1, cyclic olefins such as cyclopentene, aromatic compounds, such as styrene and α-methylstyrene and vinyl esters, such as vinyl acetate and vinyl propionate. Ethene and mixtures of ethene with another olefinically unsaturated compound, in particular an a-olefin, such as propene or butene-1 are most preferred. The term "lower" when used in reference to an organic compound in this specification means that the organic compound contains up to 6 carbon atoms.

When a copolymer is prepared by copolymerizing carbon monoxide with a mixture of ethene and another olefinically unsaturated compound, the melting point of the copolymer will be dependent of the ratio of the olefinic monomers as present in the liquid phase. Preferably this ratio is such that a copolymer is prepared which has a melting point above 175° C., as determined by differential scanning calorimetry. Melting points between 190 and 250 ° C. are more preferred.

Generally, the molar ratio of carbon monoxide and the oleflihcally unsaturated compound(s) is selected in the range of 1:5 to 5:1. Preferably the molar ratio is in the range of 1:2 to 2:1, substantially equimolar ratios being preferred most.

Examples of suitable Group VIII metals for use in the catalyst composition are nickel and cobalt. However, the Group VIII metal is preferably a noble Group VIII metal, of which palladium is most preferred.

The Group VIII metal is typically employed as a cationic species. As the source of Group VIII metal cations conveniently a Group VIII metal salt is used. Suitable salts include salts of mineral acids such as sulfuric acid, nitric acid, phosphoric acid and sulphonic acids, and organic salts, such as acetylacetonates. Preferably, a salt of a carboxylic acid is used, for example a carboxylic acid with up to 8 carbon atoms, such as acetic acid, trifluoroacetic acid, trichloroacetic acid, propionic acid and citric acid. Palladium (II) acetate and palladium (II) trifluoro-acetate represent particularly preferred sources of palladium cations. Another suitable source of Group VIII metal cations is a compound of the Group VIII metal in its zero-valent state.

In the ligands of the general formula $R^5R^6M^1$—R—$M^2R^7R^8$, $M^1$ and $M^2$ preferably represent phosphorus atoms. $R^5$, $R^6$, $R^7$ and $R^8$ may independently represent alkyl, aryl, alkaryl, aralkyl or cycloalkyl groups, at least one of which is polar substituted. Preferably $R^5$, $R^6$, $R^7$ and $R^8$ are each polar substituted.

Suitable polar groups include halogen atoms, such as fluorine and chlorine, alkoxy groups such as methoxy and ethoxy groups and alkylamino groups such as methylamino-, dimethylamino- and diethylamino groups. Alkoxy groups and alkylamino groups contain in particular up to 5 carbon atoms in each of their alkyl groups.

It is preferred that one or more, in particular each of $R^5$, $R^6$, $R^7$ and $R^8$ represents an aryl group, preferably a phenyl group, substituted at an ortho position with respect to $M^1$ or $M^2$ with an alkoxy group, especially a methoxy group.

In the ligands of formula (I), R preferably represents a bivalent organic bridging group containing from 2 to 4 bridging atoms, at least two of which are carbon atoms. Examples of such groups R are —$CH_2$—$CH_2$—, —$CH_2$—$CH_2$—$CH_2$—, —$CH_2$—$C(CH_3)_2$—$CH_2$—, —$CH_2$—$Si(CH_3)_2$—$CH_2$—, and —$CH_2$—$CH_2$—$CH_2$—$CH_2$—. Preferably R is a trimethylene group.

Preferred ligands are 1,3-bis[bis(2,4-dimethoxyphenyl)phosphino]propane, 1,3-bis[bis(2,4,6-trimethoxyphenyl)phosphino]propane and, more preferred, 1,3-bis[bis(2-methoxyphenyl)phosphino]propane.

The amount of bidentate ligand supplied may vary considerably, but is usually dependent on the amount of Group VIII metal present in the catalyst composition. Preferred amounts of bidentate ligands are in the range of from 0.5 to 8, more preferably in the range of from 0.5 to 2 moles per mole of Group VIII metal.

The Group VIII metal containing catalyst composition is typically based on a source of anions as a further catalyst component. Suitable anions are those which are noncoordinating or only weakly coordinating with the Group VIII metal under the conditions of the copolymerization. Examples of suitable anions are anions of protic acids, which include acids which are obtainable by combining a Lewis acid and a protic acid, and acids which are adducts of boric acid and a 1,2-diol, a catechol or a salicylic acid. Preferred acids are strong acids, i.e. those which have a pKa of less than 6. Preffered acids have a pKa of less than 4. The most preferred acids have a pKa of less than 2, when measured in aqueous solution at 18° C. Examples of suitable protic acids are the above mentioned acids which may also participate in the Group VIII salts, e.g. perchloric acid and trifluoro-acetic acid. Examples of Lewis acids which can be combined with a protic acid are boron trifluoride, boron pentafluoride, aluminium trifluoride and arsenic pentafluoride. Examples of protic acids which may be combined with a Lewis acid are sulphonic acids and hydrohalogenic acids, in particular hydrogen fluoride. Very suitable combinations of a Lewis acid with a protic acid are tetrafluoroboric acid and hexafluoroboric acid ($HBF_4$ and $HBF_6$). Other suitable anions are anions of which it appears that there are no stable conjugated acids, such as tetrahydrocarbylborate anions or carborate anions. Borate anions may comprise the same or different hydrocarbyl groups attached to boron, such as alkyl, aryl, aralkyl, alkaryl and cycloalkyl groups. Preferred are tetraarylborates, such as tetraphenylborate, tetrakis[3,5-bis(trifluoromethyl)phenyl]borate and tetrakis(perfluorophenyl)borate, and carborate ($B_{11}CH_{12}^-$).

The source of anions may be an acid from which the anions are derivable, or their salts. Suitable salts are, for example, cobalt and nickel salts. Other sources of anions are suitably Lewis acids, such as halides (preferably fluorides) of boron, tin, antimony, aluiminium or arsenic. Boron trifluoride and boron pentafluoride are very suitable. Other suitable Lewis acids are hydrocarbylboranes. The hydrocarbylboranes may comprise one hydrocarbyl group or two or three of the same or different hydrocarbyl groups attached to boron, such as alkyl, aryl, aralkyl, alkaryl and cycloalkyl groups, preferably aryl groups. They may also comprise hydrocarbyloxy or hydroxy groups or halogen atoms attached to boron. Examples of very suitable hydrocarbylboranes are triphenylborane, tris(perfluoro-pheny)borane and tris[3,5-bis(trifluoromethyl)phenyl]borane. Again other suitable compounds which may function as a source of anions are aluminoxanes, in particular methyl aluminoxanes and t-butyl aluminoxanes.

The quantity of the source of anions is preferably selected such that it provides in the range of from 0.1 to 50 equivalents of anions per gram atom of Group VIII metal, in particular in the range of from 0.5 to 25 equivalents of anions per gram atom of Group VIII metal. However, the aluminoxanes may be used in such a quantity that the molar ratio of aluminium to the Group VIII metal is in the range of from 4000:1 to 10:1, preferably from 2000:1 to 100:1.

In the process of this invention the Group VIII metal is present in the polymerization mixture in a quantity of above 0.1 mmoles calculated per liter of liquid phase. Preferably this quantity is at least 0.15 mmoles. It is more preferred that it be at least 0.2 mmoles calculated per liter of liquid phase. For practical reasons the upper limit will typically be 5 mmoles, in particular 2 mmoles calculated per liter of liquid phase.

The quantity of catalyst composition used relative to the quantity of olefinically unsaturated compounds may vary between wide limits. Recommended quantities of catalyst composition are in the range of $10^{-7}$ to $10^{-1}$, calculated as moles of Group VIII metal per mole of olefinically unsaturated compound to be copolymerized with carbon monoxide. Preferred quantities are in the range of $10^{-6}$ to $10^{-2}$ on the same basis.

The performance of Group VIII metal catalyst compositions in the copolymerization process may be improved by introducing an organic oxidant, such as a quinone or an aromatic nitro compound. Preferred oxidants are quinones selected from the group consisting of benzoquinone, naphthoquinone and anthraquinone. The quantity of oxidant is advantageously in the range of from 5 to 5000, preferably in the range of from 10 to 1000 mole per gram atom of metal of Group VIII.

The process of this invention is carried out in the presence of a liquid diluent in which the admixed catalyst composition is soluble and in which the copolymer to be prepared forms a suspension. This implies that a diluent will be selected in which the copolymer is insoluble or virtually insoluble. Examples of liquid diluents are ketones (e.g. acetone), chlorinated hydrocarbons (e.g. chloroform or dichloromethane), aromatics (e.g. toluene, benzene, chlorobenzene) and, preferably, protic diluents, such as lower alcohols (e.g. methanol and ethanol). Mixtures of liquid diluents may be used as well, for example protic diluents may comprise an aprotic diluent. If desired, an excess of one or more of the olefinically unsaturated compounds may be used as a liquid diluent, for example propene.

Prior to contacting the monomers with the catalyst composition a powder of a copolymer of carbon monoxide with an olefinically unsaturated compound is suspended in the liquid diluent. Typically this copolymer is based on the same monomers as the copolymer to be prepared. The latter means that, for example, when a linear alternating copolymer of carbon monoxide and ethene will be prepared, a linear alternating copolymer of carbon monoxide and ethene from an earlier polymer preparation will be suspended in the diluent.

The copolymer of carbon monoxide with an olefinically unsaturated compound is suitably suspended in a quantity of 0.1–20% w, relative to the weight of the liquid phase, more suitably in a quantity of 0.5–10% w. The bulk density of the copolymer suspended is typically in the range of 50–1000 kg/m$^3$, in particular in the range of 100–500 kg/m$^3$. The copolymer suspended has typically an average particle size of $10^{-6}$–$10^{-3}$ m, in particular $10^{-6}$–$5 \times 10^{-4}$ m. The average particle size is determined as follows. With the aid of a commercially available particle size analyzer for forward light scattering measurements, a weight distribution of a representative sample of the copolymer powder is determined as a function of the particle size. The average particle size is the median of the weight distribution function.

The copolymerization process is usually carried out at a temperature in the range of from 20 to 200° C., preferably at a temperature in the range of from 30 to 150° C., and usually applying a pressure in the range of from 0.2 to 20 MPa, pressures in the range of from 1 to 10 MPa being preferred.

The copolymer may be recovered from the polymerization mixture by any suitable conventional technique. If desired the copolymer may be purified such that catalyst residues are removed from the copolymer. Methods for the removal of catalyst residues are known, for example from EP-A-224304.

The copolymers prepared according to this invention may have a relatively high content of Group VIII metal. It is therefore advantageous to apply these copolymers as a supported catalyst in a subsequent process for the preparation of copolymers of carbon monoxide with an olefinically unsaturated compound.

The present invention also relates to this subsequent process for the preparation of copolymers of carbon monoxide with an olefinically unsaturated compound.

The copolymers for use as a supported catalyst typically have a content of Group VIII metal of 0.5–50 mmole calculated per kg of dry material. Preferably, they have a content of 0.75–20 mmole. Contents of 1–10 mmole on the same basis are most preferred. The copolymers for use as a supported catalyst are preferably based on the same monomers as those which are used in the subsequent polymerization process.

The subsequent copolymerization process may be carried out in the presence of a diluent in which the copolymer to be prepared forms a suspension. This can reduce reactor fouling relative to the use of unsupported catalyst. Alternatively, the subsequent copolymerization process may be carried out as a gas phase process, i.e. a process in which the quantity of liquid introduced, if any, is so small that the liquid will substantially be present in the gas phase so that the gas phase forms the continuous phase. Examples of gas phase processes of this type are known from e.g. EP-A-248483. When operating in accordance with the present invention little or no Group VIII metal containing composition is needed to be impregnated on a carrier in order to prepare a catalyst composition which can be used in the gas phase copolymerization process.

The copolymers prepared according to the invention are suitable as thermoplastics for fibers, films or sheets, or for injection molding, compression molding and blow molding applications. They may be used for applications in the car industry, for the manufacture of packaging materials for food and drinks and for various uses in the domestic sphere.

The invention is now illustrated by means of the following examples.

EXAMPLE 1

(Comparative)

A linear alternating copolymer of carbon monoxide with ethene and propene was prepared as follows.

A 3.8-liter autoclave equipped with baffles and a mechanical stirrer was charged with 1500 ml methanol and 29 g of a powder of a copolymer of carbon monoxide with ethene and propene obtained in a previous copolymerization and having an average particle size, as defined hereinbefore, of about 280 μm. The autoclave was closed and purged with nitrogen to remove the air present. The contents of the autoclave were heated to 76° C. Carbon monoxide, ethene and propene were fed into the autoclave such that their partial pressures were 1.3 MPa, 1.9 MPa and 1.3 MPa, respectively. A catalyst solution comprising 7.5 ml acetone, 0.057 mmoles palladium acetate, 0.060 mmoles 1,3-bis[bis(2-methoxyphenyl)phosphino] propane, and 0.34 mmoles trifluoroacetic acid was injected into the autoclave. The pressure of the autoclave was maintained by supplying a mixture of carbon monoxide, ethene and propene (50:46:4 molar ratio). The rate of supply of this mixture appeared to be virtually constant, indicating a virtually constant polymerization rate. The liquid volume obtained at these reaction conditions was about 2100 ml, so that the quantity of palladium present was about 0.027 mmoles/ liter of liquid phase.

After 68 hours reaction time the pressure was released and the autoclave was allowed to cool to room temperature. The polymer product was recovered by filtration, washed with methanol and dried. The specific polymerization rate in kg copolymer/(g palladium.hour) was calculated from the yield of copolymer. The productivity was calculated as the yield of copolymer per hour reaction time. The limiting viscosity number (LVN) of the copolymer was determined from solutions of the copolymer in m-cresol at 60° C. The results are shown in Table I.

EXAMPLES 2–5

(Examples 2 and 3 are Comparative)

A copolymer of carbon monoxide with ethene and propene was prepared as indicated in Example 1, except that the quantity of catalyst solution was increased without changing the molar ratios of the catalyst components, and the reaction times were decreased, both as indicated in Table I. The polymerization rates were found to be virtually constant.

The results are shown in Table I.

TABLE 1

| Example | Palladium mmoles/l | Reaction time h | Yield g | LVN dl/g | Polymer · rate kg/(g Pd · hour) | Productivity g/h |
|---|---|---|---|---|---|---|
| 1 a) | 0.027 | 7 | 185 | 1.6 | 3.7 | 26 |
| 2 a) | 0.054 | 3.5 | 218 | 1.6 | 4.5 | 62 |
| 3 a) | 0.081 | 2.4 | 204 | 1.5 | 4.0 | 85 |
| 4 | 0.16 | 1.2 | 179 | 1.8 | 3.4 | 150 |
| 5 | 0.26 | 0.7 | 186 | 1.6 | 3.7 | 270 | a) for comparison

EXAMPLE 6

(for comparison)

A linear alternating copolymer of carbon monoxide with ethene and propene was prepared as follows.

A 300-ml autoclave equipped with baffles and a mechanical stirrer was charged with 120 ml methanol. The autoclave was closed and purged with nitrogen to remove the air present. The contents of the autoclave were heated to 55° C. Carbon monoxide, ethene and propene were fed into the autoclave such that their partial pressures were 1.6 MPa, 2.3 MPa and 1.6 MPa, respectively. A catalyst solution comprising 5 ml methanol, 0.0050 mmoles palladium acetate, 0.0060 mmoles 1,3-bis(diphenylphosphino)propane, and 0.10 mmoles trifluoroacetic acid was injected into the autoclave. The pressure of the autoclave was maintained by supplying a mixture of carbon monoxide and ethene (1:1 molar ratio). The rate of supply of the mixture of carbon monoxide and ethene appeared to be virtually constant, indicating a virtually constant polymerization rate. The liquid volume obtained at these reaction conditions was about 230 ml, so that the quantity of palladium present was about 0.022 mmoles/liter of liquid phase.

After 16 hours reaction time the pressure was released and the autoclave was allowed to cool to room temperature. The polymer product was recovered by filtration, washed with methanol and dried.

The yield of copolymer was 11 g. The specific polymerization rate, calculated from the yield, was 1.3 kg/(g palladium.hour). The productivity was 0.69 g/hour. The limiting viscosity number (LVN) of the copolymer, determined from solutions of the copolymer in m-cresol at 100° C., was 1.2 dl/g.

EXAMPLE 7

(Comparative)

A copolymer of carbon monoxide with ethene and propene was prepared as indicated in Example 6, except that the quantity of catalyst solution was increased without changing the molar ratios of the catalyst components, such that the quantity of palladium in the polymerization mixture amounted to 0.52 mmoles/liter liquid phase, and the reaction time was 1 hour.

The yield of copolymer was 5.0 g. The specific polymerization rate was 0.4 kg/(g palladium.hour). The productivity was 5.0 g/hour. The limiting viscosity number (LVN) of the copolymer obtained was 0.3 dl/g.

Examples 4 and 5 are according to this invention, Examples 1–3, 6 and 7 are for comparison.

In Examples 1–5 the catalyst used contains a bidentate ligand with polar substituted groups at the dentate groups and a copolymer was suspended in the diluent prior to contacting the monomers with the catalyst. It can be seen that when in Examples 4 and 5 the quantity of the catalyst present in the reaction mixture is increased such that the quantity of palladium present is above 0.1 mmoles/liter liquid phase (according to the invention) practically the same specific polymerization rate is achieved as in Examples 1–3, in which the quantity of palladium present is below 0.1 mmoles/liter liquid phase. In Examples 1–5 the productivity is virtually proportional with the concentration of the catalyst.

The LVN values of the copolymers obtained in Examples 1–5 were practically the same which means that their molecular weights were also the same. In Examples 6 and 7 the catalyst used contains a bidentate ligand with non-substituted hydrocarbyl groups at the dentate groups and no copolymer was suspended in the diluent prior to contacting the monomers with the catalyst. It can be seen that when in Example 7 the quantity of the catalyst present in the reaction mixture is increased such that the quantity of palladium present is above 0.1 mmoles/liter liquid phase a substantially lower specific polymerization rate is found compared with Example 6, in which the quantity of palladium present is below 0.1 mmoles/liter liquid phase. Under these circumstances the productivity is less than proportional with the concentration of the catalyst.

The LVN value of the copolymer obtained in Example 7 is lower than the LVN of the copolymer obtained in Example 6, which means that in Example 7 the copolymer had a lower molecular weight than the copolymer of Example 6.

What is claimed is:

1. A process for the preparation of a copolymer of carbon monoxide with an olefinically unsaturated compound, which process comprises suspending a powder of a copolymer of carbon monoxide with an olefinically unsaturated compound in a liquid diluent in which the copolymer to be prepared forms a suspension and subsequently contacting the monomers in the suspension so obtained with a catalyst composition which comprises a Group VIII metal and a bidentate ligand of the formula $R^5R^6M^1$—R—$M^2R^7R^8$, wherein $M^1$ and $M^2$ independently represent a phosphorus, nitrogen, arsenic or antimony atom, $R^5$, $R^6$, $R^7$ and $R^8$ independently represent an optionally polar substituted hydrocarbyl group, at least one of $R^5$, $R^6$, $R^7$ and $R^8$ represents a polar substituted hydrocarbyl group, and R represents a bivalent organic bridging group containing at least one carbon atom in the bridge, wherein said catalyst composition is used in such a quantity that in the polymerization mixture greater than 0.1 mmoles of the Group VIII metal is present (calculated per liter of liquid phase).

2. A process as claimed in claim 1, wherein the Group VIII metal is present in the polymerization mixture in a quantity of at least 0.15 mmoles (calculated per liter of liquid phase).

3. A process as claimed in claim 1 wherein the catalyst composition contains palladium as the Group VIII metal, $M^1$ and $M^2$ represent phosphorus atoms, one or more of $R^5$, $R^6$, $R^7$ and $R^8$ represents an aryl group and R represents a bivalent organic bridging group containing from 2 to 4 bridging atoms, at least two of which are carbon atoms.

4. A process as claimed in claim 3 further comprising, as an additional catalyst component, a source of anions selected from the group consisting of protic acids, tetrahydrocarbylborate anions and carborate anions, Lewis acids and alumninoxanes, which anions are applied in a quantity of from 0.5 to 25 equivalents per gram atom of Group VIII metal.

5. A process as claimed in claim 3, further comprising, as an additional catalyst component aluminoxanes applied in such a quantity that the molar ratio of aluininum to the Group VIII metal is in the range of from 2000:1 to 100:1.

6. A process as claimed in claim 1 wherein the copolymer of carbon monoxide with an olefinically unsaturated compound is suspended in a quantity of 0.1–20% w, relative to the weight of the liquid phase.

7. A process as claimed in claim 1 wherein the copolymer of carbon monoxide with an olefinically unsaturated compound suspended in the liquid diluent is based on the same monomers as the copolymer to be prepared.

8. A process as claimed in claim 1 wherein the bulk density of the suspended copolymer is in the range of 50–1000 $kg/m^3$.

9. A process as claimed in claim 1 wherein the olefinically unsaturated compound is selected from the group consisting of ethene, propene, butene-1 and mixtures thereof.

10. A process as claimed in claim 1 carried in a protic diluent, at a temperature in the range of from 30 to 150° C. and a pressure in the range of from 1 to 10 MPa, with the molar ratio of carbon monoxide to olefinically unsaturated compound(s) selected in the range of 1:2 to 2:1, and using a quantity of catalyst composition in the range of $10^{-6}$ to $10^{-2}$, calculated as moles of Group VIII metal per mole of olefinically unsaturated compound to be copolymerized with carbon monoxide.

11. A process for the preparation of a copolymer of carbon monoxide with an olefinically unsaturated compound, which process comprises copolymerizing the monomers in the presence of a copolymer obtained in a process as claimed in claim 1 as a supported catalyst.

* * * * *